(12) United States Patent
Shimizu et al.

(10) Patent No.: US 9,476,456 B2
(45) Date of Patent: Oct. 25, 2016

(54) ROLLING BEARING

(71) Applicants: Yasuhiro Shimizu, Mie (JP); Kiyoshige Yamauchi, Mie (JP); Naota Yamamoto, Mie (JP); Hiroyuki Miyazaki, Mie (JP)

(72) Inventors: Yasuhiro Shimizu, Mie (JP); Kiyoshige Yamauchi, Mie (JP); Naota Yamamoto, Mie (JP); Hiroyuki Miyazaki, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/654,565

(22) PCT Filed: Dec. 10, 2013

(86) PCT No.: PCT/JP2013/083043
§ 371 (c)(1),
(2) Date: Jun. 22, 2015

(87) PCT Pub. No.: WO2014/103694
PCT Pub. Date: Jul. 3, 2014

(65) Prior Publication Data
US 2015/0337902 A1    Nov. 26, 2015

(30) Foreign Application Priority Data

Dec. 28, 2012  (JP) .................................. 2012-286770

(51) Int. Cl.
*F16C 33/66* (2006.01)
*F16C 33/76* (2006.01)
(Continued)

(52) U.S. Cl.
CPC ......... *F16C 33/586* (2013.01); *B29C 45/0025* (2013.01); *F16C 19/26* (2013.01);
(Continued)

(58) Field of Classification Search
CPC ............ F16C 33/6622; F16C 33/6625; F16C 33/667; F16C 33/7816; F16C 33/782; F16C 33/7823; F16C 33/7826; F16C 33/7853; F16C 33/7856; F16C 33/7889; F16J 15/164; F16J 15/3204; F16J 15/3216; F16J 15/322; F16J 15/3256; F16J 15/3268; F16J 15/328
USPC ........ 277/568, 918; 384/469, 473, 477, 484, 384/485
See application file for complete search history.

(56) References Cited

U.S. PATENT DOCUMENTS

| 5,492,416 A | 2/1996 | Gabelli et al. |
| 2008/0187261 A1 | 8/2008 | Tanaka et al. |
| 2014/0011622 A1 | 1/2014 | Sone et al. |

FOREIGN PATENT DOCUMENTS

| DE | 19634689 A1 * | 3/1998 | .......... F16C 33/6607 |
| DE | 19958788 A1 * | 6/2001 | ............ F16C 33/667 |
| DE | 20 2010 017 137 | 2/2012 | |
| GB | 1319953 A * | 6/1973 | ............ F16C 33/667 |

(Continued)

OTHER PUBLICATIONS

International Search Report issued Mar. 11, 2014 in International (PCT) Application No. PCT/JP2013/083043.
(Continued)

*Primary Examiner* — Phillip A Johnson
(74) *Attorney, Agent, or Firm* — Wenderoth, Lind & Ponack, L.L.P.

(57) ABSTRACT

A rolling bearing is provided wherein one open end of a bearing space formed between an outer race and an inner race is covered with a sealing ring provided with oil flow holes provided with filters. The sealing ring includes engaging portions provided on the sealing ring in a protruding manner along a circumferential direction thereof, and engaged in recesses provided on the inner race. An annular member made of a material softer than that of the sealing ring is fixed to the sealing ring. The annular member includes a lip portion facing the outer race with a gap or kept in contact with the outer race. The sealing ring is formed by injection molding a resin, and weld lines generated during the injection molding are formed in portions of the sealing ring corresponding to radial directions along which the oil flow holes are not disposed.

8 Claims, 7 Drawing Sheets

(51) Int. Cl.
*F16J 15/32* (2016.01)
*F16C 33/58* (2006.01)
*F16C 19/26* (2006.01)
*F16C 33/78* (2006.01)
*F16C 43/06* (2006.01)
*F16C 43/04* (2006.01)
*B29C 45/00* (2006.01)
*B29L 31/26* (2006.01)
*F16C 33/72* (2006.01)
*F16C 19/36* (2006.01)

(52) U.S. Cl.
CPC .......... *F16C 33/667* (2013.01); *F16C 33/783* (2013.01); *F16C 33/7816* (2013.01); *F16C 33/7833* (2013.01); *F16C 33/7889* (2013.01); *F16C 43/06* (2013.01); *B29C 2045/0034* (2013.01); *B29L 2031/26* (2013.01); *F16C 19/364* (2013.01); *F16C 33/726* (2013.01); *F16C 33/7886* (2013.01); *F16C 43/045* (2013.01); *Y10T 29/49684* (2015.01)

(56) References Cited

FOREIGN PATENT DOCUMENTS

| | | | |
|---|---|---|---|
| JP | 03-180313 | 8/1991 | |
| JP | 06-323335 | 11/1994 | |
| JP | 2002-250354 | 9/2002 | |
| JP | 2006-007684 | 1/2006 | |
| JP | 2006-322538 | 11/2006 | |
| JP | WO 2012128054 A1 * | 9/2012 | ........... B60K 17/046 |
| JP | 2012-211692 | 11/2012 | |
| NL | EP 0600559 A1 * | 6/1994 | ......... F16C 33/6666 |
| NL | EP 0661473 A1 * | 7/1995 | ............ F16C 33/667 |
| WO | 2006/123795 | 11/2006 | |
| WO | 2012/128316 | 9/2012 | |

OTHER PUBLICATIONS

Written Opinion of the International Searching Authority issued Mar. 11, 2014 in International (PCT) Application No. PCT/JP2013/083043 (with English translation).
Extended European Search Report issued Sep. 14, 2015 in corresponding European Patent Application No. 13 86 7401.

* cited by examiner

Fig. 2
(a)
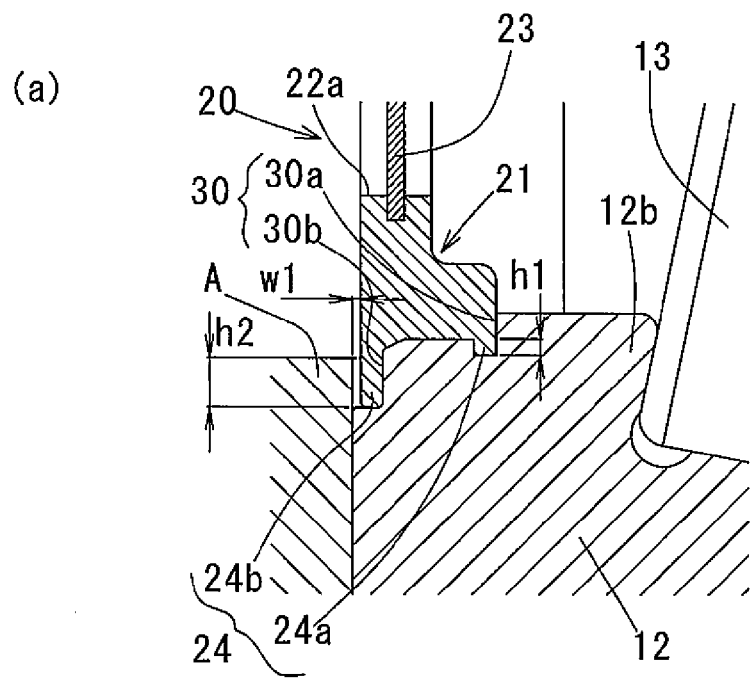
(b)
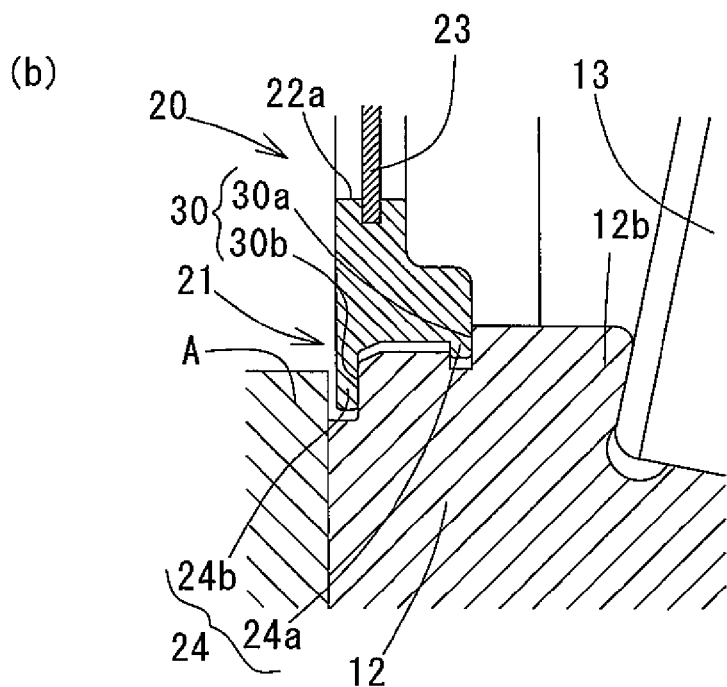

Fig. 3
(a)
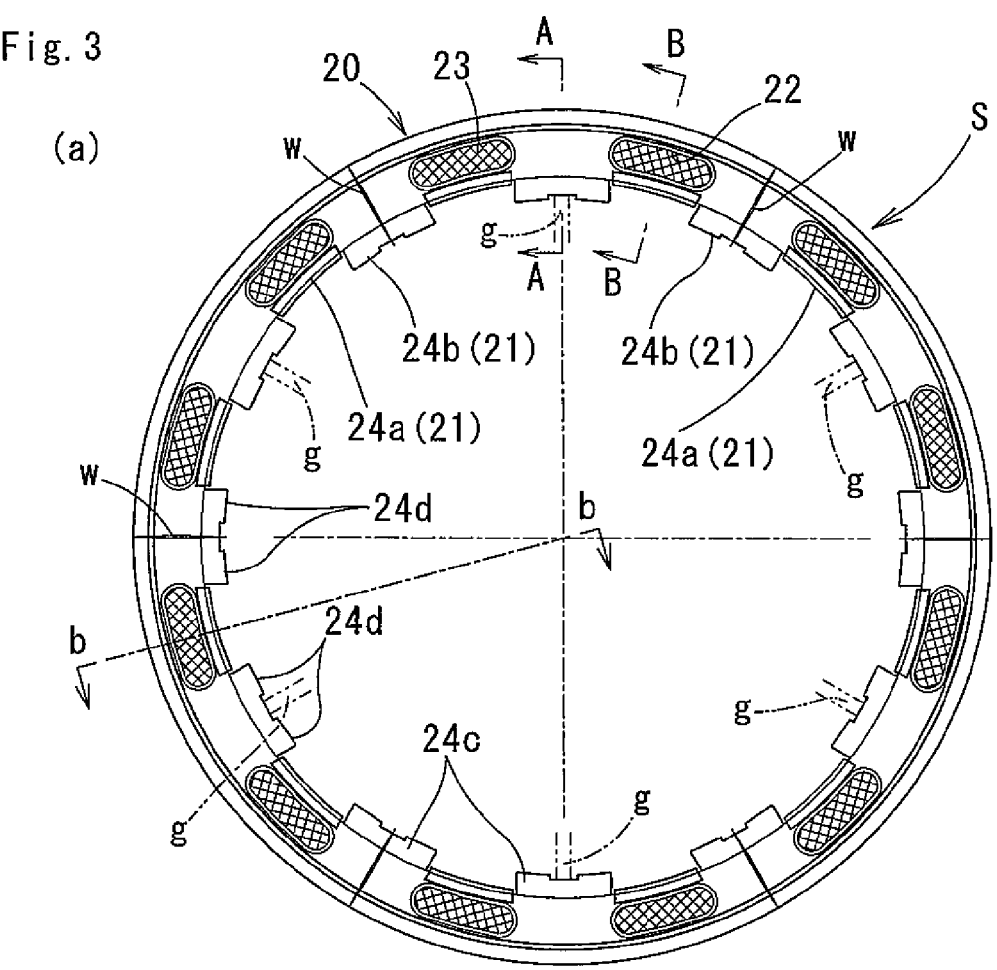
(b)
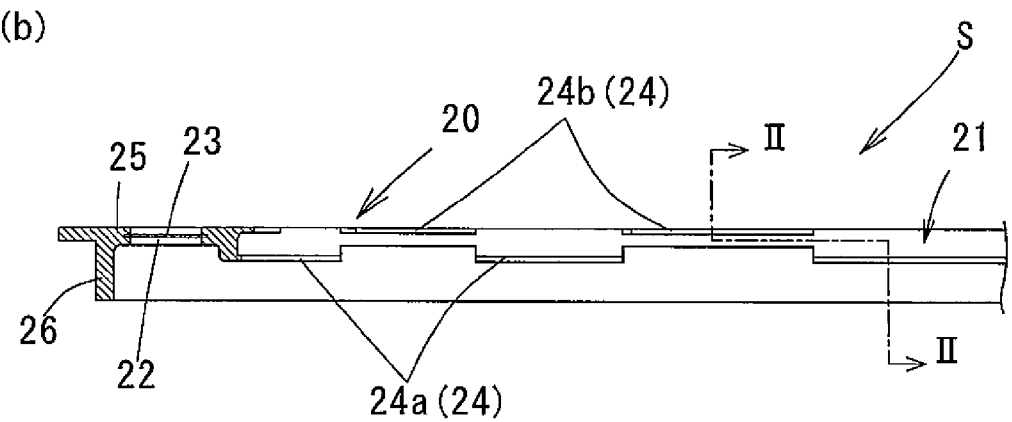

ROLLING BEARING

BACKGROUND OF THE INVENTION

1. Field of the Invention

The present invention relates to a rolling bearing lubricated with oil. More specifically, the present invention relates to a rolling bearing lubricated with oil which is filtered through filters.

2. Description of Related Art

Power transmission devices such as transmissions, differentials and reduction gears in automobiles and various types of construction machines, or travel units including these devices, include rolling bearings.

Some of these types of travel units have a structure in which rolling bearings are lubricated with the same oil used to lubricate the power transmission devices.

However, the oil filled inside the casings of the power transmission devices such as transmissions, differentials and reduction gears contains relatively large amount of foreign substances, such as gear wear debris (iron dust and the like). If the foreign substances contained in the oil get inside the rolling bearing, the foreign substances between the raceway surfaces of the rolling bearing and the rolling contact surfaces of the rolling elements in the bearing could cause peeling on these surfaces, thereby resulting in a decrease in the durability of the rolling bearing.

Therefore, in order to prevent the entry of foreign substances, a rolling bearing equipped with filters is proposed, in which a sealing ring attached to the rolling bearing is provided with filters. The sealing ring is an elastic sealing member made of an elastomeric material, wherein the sealing ring is provided with oil flow holes for allowing oil to pass therethrough, and wherein the oil flow holes are provided with filters configured to capture the foreign substances contained in the oil (for example, JP 6-323335 A and JP 2002-250354 A).

PROBLEMS TO BE SOLVED BY THE INVENTION

In the rolling bearing equipped with filters disclosed in JP 6-323335 A and JP 2002-250354 A, the sealing ring made of an elastomeric material (hereinafter, the sealing ring made of an elastomeric material is referred to as "elastic sealing member", in particular) is provided with oil flow holes, and the oil flow holes are covered with filters.

However, in the above-mentioned rolling bearing, the elastic sealing member is exposed to the opening of a bearing space, in other words, the elastic sealing member is exposed to the portion of the bearing to which the sealing member is attached, without having a cored bar. Therefore, if any kind of external force is applied to the elastic sealing member, when the bearing is being assembled, transferred and/or mounted into a mechanical device, there is a potential risk that the elastic sealing member could deform, or may not be assembled or mounted as intended, thereby compromising the sealing properties of the sealing member.

In addition, in order to prevent the deterioration of the sealing properties of the sealing ring and to elongate the service life thereof, the interference between the elastic sealing member and the bearing needs to be precisely controlled.

Since the elastic sealing member is directly attached to the bearing, the precision of the dimensions of the elastic sealing member and the bearing need to be further enhanced, in order to improve the precision of the interference therebetween. However, efforts to improve the precision of the interference lead to an increase in the production cost. In addition, there is a limit in the dimensional control of the elastic sealing member, which is a molded article.

SUMMARY OF THE INVENTION

Accordingly, the present invention relates to a sealing ring for use in a rolling bearing, the sealing ring being provided with filters, and an object of the present invention is to prevent the deterioration of the sealing properties of the sealing ring and to elongate the service life thereof.

Means for Solving the Problems

In order to solve the above-mentioned problems, the present invention has adopted the following constitution.

A rolling bearing comprising: an outer race; an inner race; and rolling elements received between the outer race and the inner race;

wherein at least one end of an opening of a bearing space formed between the outer race and the inner race is covered with a sealing ring made of a resin;

wherein the sealing ring is provided with oil flow holes, and the oil flow holes are provided with filters configured to capture foreign substances contained in a lubricating oil; and wherein the sealing ring is formed by injection molding, and weld lines generated during the injection molding are formed in portions of the sealing ring corresponding to radial directions along which the oil flow holes are not disposed.

When the sealing ring made of a resin is formed by injection molding, it is inevitable that weld lines of some sort are formed. If the weld lines are formed in the portions of the sealing ring corresponding to the radial directions along which the oil flow holes are not disposed, it is possible to improve the strength and the reliability of the sealing ring, and to further elongate the service life thereof. In other words, since the strength of the portions of a molded article having weld lines could sometimes be reduced by 40 to 50% relative to the tensile strength of a base material, it is advantageous to design the sealing ring so that the weld lines are formed in the portions of the sealing ring other than the portions in which the oil flow holes are disposed and which have a small sectional area and a relatively low strength.

In order to allow the weld lines, which are generated during the injection molding, to be formed in the portions of the sealing ring corresponding to the radial directions along which the oil flow holes are not disposed, for example, gates through which the resin is supplied during the injection molding can be disposed in the portions of the sealing ring corresponding to the radial directions along which the oil flow holes are not disposed. If the gates are disposed in the portions of the sealing ring corresponding to the radial directions along which the oil flow holes are disposed, the flow of the resin tends to branch and to flow around, avoiding the oil flow holes.

The gates are inlets through which melted resin is supplied into a mold and have functions of blocking the flow path to prevent back-flow of the resin until the melted resin is cooled and solidified.

The weld lines are lines formed in a molded article due to defective welding (a kind of defective molding), when a resin part is formed by molding. The weld line is generated when the flows of a melted material merge, and the flows of the melted material are cooled and solidified at the point of merging before they are completely fused together.

In particular, the weld line is generated when the flow of the resin is branched into multiple streams, within the space in the mold, in order to avoid a member(s) for forming a hole(s) in a molded article, or to avoid obstacles such as a shaft to be embedded in the molded article, and when the branched flows of the resin merge. It is because, the top portion of the resin flow flowing in the mold is easily cooled, and it is the first to be solidified. The weld lines can be visually confirmed on the surface of the resulting molded article as thin lines in appearance. As described above, there are cases where weld lines could contribute to a poor appearance and/or strength of the molded article, depending on the positions at which they are formed, or on the degree thereof. The positions of the gates can also be visually confirmed on the surface of the resulting molded article.

In the rolling bearing having each of the above-mentioned constitutions, it is possible to adopt a constitution wherein the sealing ring includes a plurality of engaging portions provided on a radially inner surface of the sealing ring in a protruding manner along the circumferential direction thereof; wherein the inner race includes recesses provided on the outer peripheral surface thereof and engaging with the engaging portions; wherein an annular member made of a material softer than that of the sealing ring is fixed to the sealing ring; and wherein the annular member includes a lip portion which faces the outer race with a gap or comes into contact with the outer race.

In cases where the annular member is included, the material of the annular member is not particularly limited, as long as it is a material softer than that of the sealing ring. For example, the annular member can be made of an elastomeric material, which is softer than the resin which constitutes the sealing ring, in other words, the annular member can be made of a rubber.

With this arrangement, the sealing ring fixed to the race is made of a material which is relatively harder compared with that of the annular member which includes the lip portion, and therefore, the sealing ring is resistant to deformation due to an external force, in other words, it does not deform easily when an external force is applied thereto. Therefore, by fitting the main body of the sealing ring made of a material which is not easily deformed to the bearing to be fixed thereto (for example, by fitting the radially inner portion of a resin ring to the radially outer portion of a bearing cone to be fixed thereto), it is possible to more reliably prevent the entry of foreign substances through a gap therebetween and to secure the sealing properties of the sealing ring. Further, the filters can be firmly fixed to the main body of the sealing ring, which is made of the material which is not easily deformed. In addition, only the annular member including the lip portion, which portion is soft and relatively susceptible to damage, can be replaced, without replacing the main body of the sealing ring.

This serves to prevent the deterioration of the sealing properties of the sealing ring, and to elongate the service life of the sealing member and the bearing, including the sealing ring.

In general, in cases where a rolling bearing is used in harsh working conditions in which lubricating oil may be contaminated with foreign substances, there is a potential risk that the bearing could be damaged before it reaches its calculated service life, depending on the conditions of maintenance. In the rolling bearing according to the present invention, the entry of hazardous foreign substances into the bearing can be reliably prevented for a long period of time, even in cases where the bearing is used in harsh working conditions in which the lubricating oil may be contaminated with foreign substances, thereby preventing a decrease in the service life of the bearing.

In the rolling bearing having the above-mentioned constitutions, a glass fiber reinforced resin, for example, can be used as the material for the sealing ring. The glass fiber reinforced resin has a higher rigidity compared to an elastomer alone, and it is a material which is not easily deformed when an external force is applied thereto. The use of such a material is effective in securing the sealing properties of the sealing ring.

In other words, when the resin ring member constituting the main body of the sealing ring is fitted to the bearing to be fixed thereto, in order to prevent the entry of foreign substances into the bearing, a hoop stress (circumferential stress) or an external force generated due to the fitting may be applied to the resin ring member. However, if the glass fiber reinforced resin is used as the material for the resin ring member, it is possible to produce a ring member excellent in strength which will not be damaged when the stress or force is applied thereto at the time of fitting. Since no dimensional alteration is required in order to change the material of the resin ring to the glass fiber reinforced resin, the production thereof does not require any additional cost.

In addition, by using the glass fiber reinforced resin as the material, it is possible to reduce the risk of deformation or damaging of the resin ring member constituting the sealing ring, as well as to further elongate the service life and to improve the reliability, of the resin ring member and the bearing.

However, if the glass fiber reinforced resin is used as a material for the sealing ring, there are cases where welded portions of the sealing ring have a relatively low strength, because fibers in the resin may not be sufficiently intertwined at the welded portions. If it is assumed, for argument's sake, that fibers contained in the glass fiber reinforced resin are not intertwined at all, the sealing ring made thereof is assumed to have a strength no greater than the strength of a sealing ring made of a material which does not contain any reinforcing fiber. Thus, the consideration is required less such a situation should occur. Accordingly, it is particularly effective to utilize a method and a structure which allow the weld lines to be formed in the portions of the sealing ring corresponding to the radial directions along which the oil flow holes are not disposed. With this arrangement, the weld lines are formed in the portions of the sealing ring having a large sectional area, and therefore, the reduction in the strength of the sealing ring can be minimized, and at the same time, a favorable effect can be expected such that the fibers are more likely to be intertwined at the welded portions because the resin is allowed to flow more freely due to the welded portions having a large sectional area.

Further, by appropriately determining the number and positions of the weld lines, and the relative positions of the gates and the weld lines, it is possible to minimize the reduction in the strength of the sealing ring, as well as to improve the strength and the reliability, and to elongate the service life, of the sealing member provided with filters.

For example, it is possible to adopt a constitution in which an even number of the oil flow holes and an even number of the engaging portions are formed in the sealing ring. If an even number of the oil flow holes and an even number of the engaging portions are formed in the sealing ring, the number of the spaces between the oil flow holes adjoining along the circumferential direction of the sealing ring will also be an even number. Therefore, if each of the gates is provided at every other space, or at every other odd numbered-space, of all the even number of spaces between the oil flow holes, the weld lines are more likely to be formed in spaces therebetween at which the gates are not disposed.

Since the number of the engaging portions is also an even number, the even number of the engaging portions can be easily disposed in the spaces between the oil flow holes. At this time, the number of the oil flow holes is preferably the same as the number of the engaging portions. Alternatively, the number of the engaging portions is preferably a multiple or divisor (although limited to even numbers) of the number of the oil flow holes.

It is also possible to provide the gates such that they face the engaging portions. Since the engaging portions are formed in a protruding manner, it is effective to provide the gates at the protruded portion of the engaging portions.

Further, in the rolling bearing having a constitution wherein the engaging portions include inner protrusions disposed on the axially inward side thereof and protruding radially inwardly at a relatively low height; and outer protrusions disposed on the axially outward side thereof and protruding radially inwardly at a relatively high height; it is preferred that the oil flow holes and the outer protrusions are disposed such that the radial directions along which the oil flow holes are disposed do not coincide with the radial directions along which the outer protrusions are disposed. Since the portions of the sealing ring in which the oil flow holes are formed have a small sectional area, if the positions of the oil flow holes circumferentially coincide with the positions of the outer protrusions, which are protruding at a relatively high height, forces are more likely to be applied to the portions having a small sectional area and to the filters attached thereto.

In the rolling bearing having the above-mentioned constitutions, the interval between the oil flow holes and the interval between the engaging portions, in the circumferential direction of the sealing ring, can be selected as appropriate. However, it is preferred that the oil flow holes and the engaging portions be disposed circumferentially spaced apart from each other at regular intervals. Particularly, it is preferred that the outer protrusions be disposed circumferentially spaced apart from each other at regular intervals.

Further, in the rolling bearing having the constitution wherein the oil flow holes and the outer protrusions are disposed circumferentially spaced apart from each other at regular intervals, the number of gates through which the resin is supplied during the injection molding can be set to half of the number of the oil flow holes. If the number of the gates is half of the number of the oil flow holes, it is easier to dispose each of the gates at every other space of all the even number of spaces between the oil flow holes adjoining along the circumferential direction of the sealing ring. The gates are preferably disposed circumferentially spaced apart from each other at regular intervals.

As described above, the gates are preferably disposed in the portions of the sealing ring corresponding to the radial directions along which the oil flow holes are not disposed. However, in cases where the outer protrusions are provided in the portions of the sealing ring corresponding to the radial directions along which the oil flow holes are not disposed, by disposing the gates at the protruded portions constituting the outer protrusions, as described above, the resin can be smoothly filled into the protruded portions.

However, it is preferred that the gates be disposed at the portions of the outer protrusions other than those configured to directly engage with one of the recesses provided on one of the races. Since the resin constituting the molded article is cut and separated at the positions of the gates, there are cases where minute irregularities and small burrs could occur thereat.

Therefore, in the rolling bearing having a constitution wherein the outer protrusions include convex portions provided on the radially inner surface of the sealing ring in a protruding manner, and fitting portions included in the convex portions; and wherein the fitting portions are configured to engage with one of the recesses, it is possible to dispose the gates through which the resin is supplied during the injection molding, in the portions of the sealing ring corresponding to the radial directions along which the fitting portions of the convex portions are not disposed. For example, in cases where the convex portions are longitudinally shaped along the circumferential direction of the sealing ring, and the fitting portions are formed at both longitudinal ends of the respective convex portions, each of the gates can be formed in the mid portion of the respective convex portions sandwiched between the fitting portions formed at both ends thereof. Thus, the gates are preferably provided at the portions of the convex portions other than the fitting portions, which fitting portions are configured to engage with one of the recesses formed on the radially outer portion of the bearing cone.

As the method for producing the rolling bearing having each of the above-mentioned constitutions, it is possible to adopt the following constitution.

That is, a method for producing the rolling bearing, wherein the rolling bearing includes: an outer race; an inner race; and rolling elements received between the outer race and the inner race;

wherein at least one end of an opening of a bearing space formed between the outer race and the inner race is covered with a sealing ring made of a resin;

wherein the sealing ring is provided with oil flow holes, and the oil flow holes are provided with filters configured to capture foreign substances contained in a lubricating oil;

wherein the sealing ring includes a plurality of engaging portions provided on the radially inner surface of the sealing ring in a protruding manner along the circumferential direction thereof;

wherein the inner race includes recesses provided on the outer peripheral surface thereof and engaging with the engaging portions;

wherein an annular member made of a material softer than that of the sealing ring is fixed to the sealing ring;

wherein the annular member includes a lip portion which faces the outer race with a gap or comes into contact with the outer race; and wherein the sealing ring is formed by injection molding, and gates (g) through which the resin is supplied during the injection molding are disposed in portions of the sealing ring corresponding to radial directions along which the oil flow holes are not disposed, so that weld lines (w) generated during the injection molding are formed in the portions of the sealing ring corresponding to the radial directions along which the oil flow holes are not disposed.

Effect of the Invention

In the rolling bearing according to the present invention, the sealing ring is provided with the oil flow holes which are provided with the filters, and the weld lines are disposed in the portions of the sealing ring corresponding to the radial directions along which the oil flow holes are not disposed.

Therefore, it is possible to improve the strength and the reliability of the sealing ring, as well as to further elongate the service life thereof.

Further, in cases where the sealing ring is provided with the annular member, the sealing ring which is fixed to the race is made of a material harder than that of the annular member which includes the lip portion. Therefore, by fitting the main body of the sealing ring to the bearing to be fixed thereto, the entry of foreign substances through a gap therebetween can be prevented more reliably, and the sealing properties of the sealing ring can be secured. In addition, the filters can be firmly fixed to the main body of the sealing ring, which is made of a material not easily deformed. Moreover, only the annular member including the lip portion, which lip portion is soft and relatively susceptible to damage, can be replaced, without replacing the main body of sealing ring. This serves to prevent the deterioration of the sealing properties of the sealing ring, and to elongate the service life of the sealing member and the bearing, including the sealing ring.

BRIEF DESCRIPTION OF THE DRAWINGS

FIG. 2 (*a*) and FIG. 2 (*b*) are enlarged sectional views of the main section of the rolling bearing shown in FIG. 1

FIG. 3 (*a*) is a side view of a sealing member in the rolling bearing shown in FIG. 1; and FIG. 3 (*b*) is a sectional view of the sealing member shown in FIG. 3 (*a*) taken along the line b-b.

FIG. 4 (*b*) is a sectional view of the sealing member shown in FIG. 3(*a*) taken along the line B-B.

MODE FOR CARRYING OUT THE INVENTION

Figure 1:
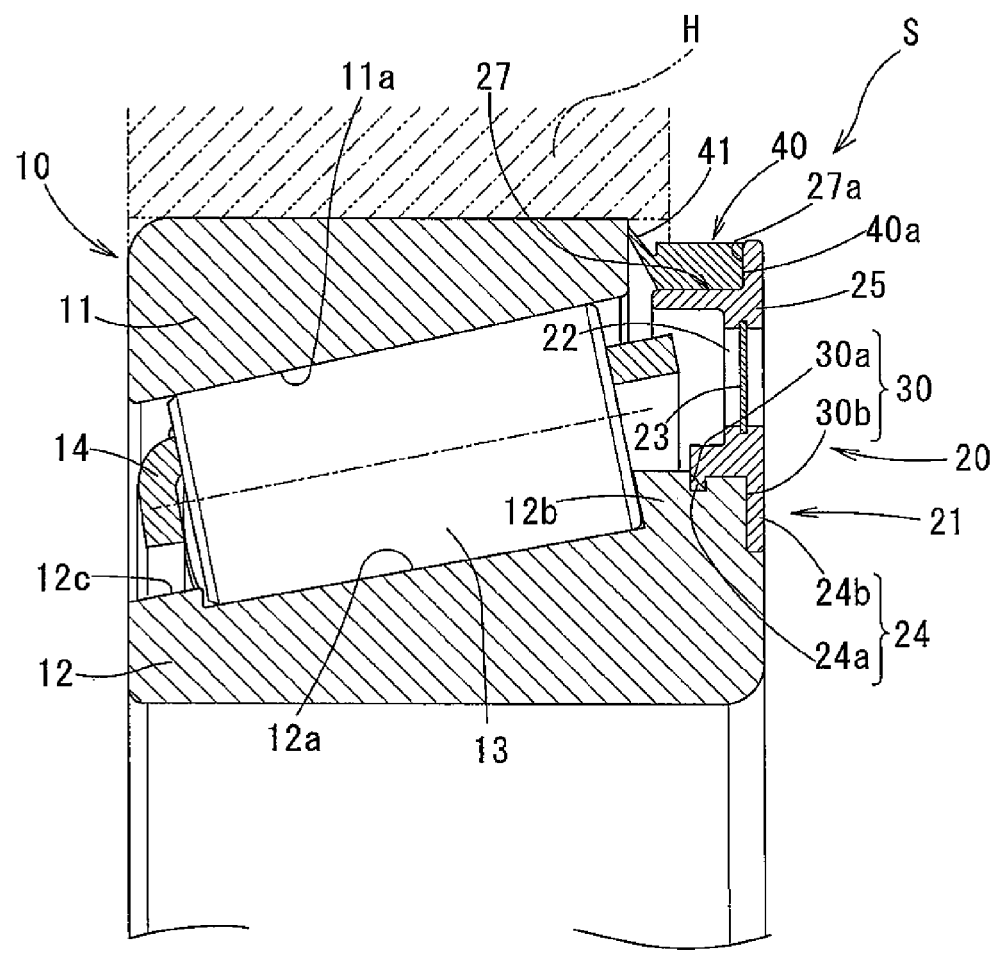
FIG. 1 is a sectional view of a main section of a rolling bearing, illustrating one embodiment of the present invention.

The embodiments of the present invention will now be described with reference to the drawings. A rolling bearing 10 according to the embodiment of the present invention is a tapered roller bearing. The rolling bearing 10 includes, as shown in FIG. 1, an outer race 11, an inner race 12, and tapered rollers as rolling elements 13 received between the raceway surface 11*a* of the outer race 11 and the raceway surface 12*a* of the inner race 12. The positions of the rolling elements 13 in the circumferential direction are retained by a retainer 14.

In the present embodiment, the inner race 12 is designed to be a fixed side, capable of being fixed to an shaft, and the outer race 11 is designed to be a rotating side configured to rotate together with a housing H. However, a reversed embodiment is also possible in which the inner race 12 is designed to be the rotating side and the outer race 11 is designed to be the fixed side.

A sealing member S is attached to the rolling bearing 10. The sealing member S is attached so as to cover at least one end of the bearing space defined in the rolling bearing 10.

The sealing member S includes, as shown in FIG. 1, a sealing ring 20 (the main body of the sealing ring) which integrally includes: engaging portions 21 engaging with the inner race 12 of the rolling bearing 10; a wall portion 25 extending radially outward from the engaging portions 21; and an lip attaching portion 27 provided at the radially outer edge of the wall portion.

The sealing ring 20 is made of a resin, and oil flow holes 22 are disposed in the wall portion 25 of the sealing ring 20. Filters 23 are fixed to the oil flow holes 22 so as to cover them, and configured to capture foreign substances contained in lubricating oil.

The filters 23 are fitted to inner surfaces 22*a* of the oil flow holes 22 to be fixed thereto. Each filter 23 may be provided with an enclosing frame so that the filter 23 is detachable from the sealing ring 20 together with the frame. Alternatively, the filters 23 can be fixed to the inner surfaces 22*a* of the oil flow holes 22 with an adhesive. Further, the filters 23 and the sealing ring 20 can be formed by insert molding (embedded and fixed).

Although the filters 23 can be of any material, a mesh-like member made of a resin or a metal can be used as the filters 23, for example.

Particularly, in the present embodiment, a polyamide resin or the like is used as the material for both the mesh-like member for use as the filters 23, and the sealing ring 20, although other resins can also be used. Such other resins include polyacetal (POM), polycarbonate (PC), polyethylene terephthalate (PET), polybutylene terephthalate (PBT), polyether ether ketone (PEEK), polyphenylene sulfide (PPS), polytetrafluoroethylene (PTFE), polysulfone (PSF), polyether sulfone (PES), polyimide (PI) and polyether-imide (PEI). Further, one of the above-mentioned resins may be reinforced with glass fiber. As such glass fiber reinforced resin, for example, PA (polyamide) 46+GF, or PA (polyamide) 66+GF can be used.

The content of the glass fiber in the glass fiber reinforced resin is optimized based on the shrinkage ratio and the required strength of the resin, and it is preferably from 15 to 35%, more preferably from 25 to 30%, for example. In general, the higher the content of the glass fiber, the lower the shrinkage ratio of the resin, and thus the easier the dimensional control of the molded article after molding becomes. Conversely, the lower the content of the glass fiber, the lower the strength of the resin, and thus the more susceptible to deformation the molded article becomes. Therefore, the content of the glass fiber for achieving the optimal balance between the shrinkage ratio and the strength is from 25 to 30%.

Instead of a glass fiber reinforced resin, a carbon fiber reinforced resin, a polyethylene fiber reinforced resin, or an aramid fiber reinforced resin can also be used as the material for the filters 23 and sealing ring 20.

As shown in FIG. 1, an annular member 40 is fixed to the lip attaching portion 27 of the sealing ring 20. The annular member 40 is made of a rubber, which is softer than the material of the sealing ring 20. The annular member 40 is fixedly fitted to the outer periphery of the lip attaching portion 27, and is in close contact with the lip attaching portion 27 by the elasticity of the annular member 40. As the material of the annular member 40, a synthetic rubber such as nitrile rubber, acrylic rubber, urethane rubber and fluoro rubber, for example, can be used.

The annular member 40 fixed to the lip attaching portion 27 includes a lip portion 41 which abuts the outer race 11. The sealing ring 20 fixed to the inner race 12 is made of a material relatively harder than that of the annular member 40 which includes the lip portion 41. Therefore, the sealing ring 20 is resistant to deformation due to an external force, in other words, it does not deform easily when an external force is applied thereto. Thus, the filters 23 are firmly fixed to the sealing ring 20 made of the material which is not easily deformed. In addition, it is possible to replace the annular member 40 including the lip portion 41, which portion is soft and relatively susceptible to damage, without replacing the sealing ring 20. Therefore, it is possible to prolong the service life of the sealing member S and the bearing including the sealing member S.

Since the annular member 40 including the lip portion 41, and the sealing ring 20 which is fixed to the inner race 12, are formed as separate members, it is possible to adjust the position of the annular member 40 relative to that of the sealing ring 20, in the bearing width direction.

This adjustment can be performed by, for example, inserting a member for dimensional adjustment between the axially outer end surface 40a of the annular member 40 and the axially inner end surface 27a of the lip attaching portion 27. If a plate-like member (shim) is used as the member for dimensional adjustment, adjustment of the dimensions can be easily performed by preparing a plurality of plate-like members having different plate thicknesses.

If the position of the annular member 40 relative to that of the sealing ring 20 can be adjusted as described above, the lip interference of the sealing member S can be easily adjusted. This arrangement allows for not only the readjustment of the lip interference when the lip portion 41 is worn out, but also the use of the sealing ring 20 and the annular member 40 in a bearing of a different model having a different width dimension.

The oil flow holes 22 can be formed, for example, in the shape of elongated holes having circular arc-shaped sides in side view, as shown in FIG. 3, or alternatively, elongated holes which are oval-shaped in side view, or elongated holes which are rectangular-shaped in side view. The oil flow holes 22 are spaced apart from each other in the circumferential direction of the sealing ring 20. In the present embodiment, all of the oil flow holes 22 have the same shape and size, and they are spaced apart from each other at regular intervals in the circumferential direction of the sealing ring 20. However, the number and the size of the oil flow holes 22 and the intervals between them can be determined as appropriate.

As the filters 23, mesh-like resin members having a mesh size of about 0.1 to 1 mm can be used. Although mesh-like resin members having a mesh size of 0.5 mm are used as the filters 23 in the present embodiment, the mesh size of the filters 23 can be determined as appropriate depending on the size of foreign substances intended to be captured.

The sealing ring 20 is engaged with the inner race 12 so as to be movable in the radial direction when the sealing ring 20 is thermally expanded due to a rise in temperature, by bringing the engaging portions 21 provided on the radially inner surface of the sealing ring 20 in a protruding manner into engagement with sealing grooves (recesses) 30 provided on the outer peripheral surface of the inner race 12 and extending in the circumferential direction.

The structure of the engaging portion 21 and the sealing grooves 30 will now be described in detail. As shown in FIG. 1 to FIG. 3, the engaging portion 21 of the sealing ring 20 includes protrusions 24 which are provided at the radially inner edge of the wall portion 25 and extend radially inward.

The protrusions 24 include inner protrusions 24a disposed at positions closer to the rolling elements 13 (axially inward), and outer protrusions 24b disposed at positions farther from the rolling elements 13 (axially outward). The sealing grooves 30 include an inner sealing groove 30a into which the inner protrusions 24a are inserted, and an outer sealing groove 30b into which the outer protrusions 24b are inserted. The inner protrusions 24a protrude radially inwardly by a relatively short length, and the outer protrusions 24b protrude radially inwardly by a relatively large length.

By the protrusions 24 being inserted into the sealing grooves 30, the sealing ring 20 is engaged with the inner race 12 so as to be movable in the radial direction when the sealing ring 20 is thermally expanded due to a rise in temperature.

Since the protrusions 24 include two types of protrusions 24a and 24b provided along the axial direction, these two types of protrusions 24a and 24b disposed in axially different positions allow the sealing ring 20 to be more securely engaged with the inner race 12.

As shown in FIG. 2 (a), in a state (normal state) before the temperature of the oil or the like for lubricating the rolling bearing 10 is elevated, depth h1, which is the depth the inner protrusions 24a are inserted into the inner sealing groove 30a, is set relatively smaller than depth h2, which is the depth the outer protrusions 24b are inserted into the outer sealing groove 30b.

Therefore, when the sealing ring 20 is pressed into the opening of the bearing space in the bearing 10 to be fixed thereto, the inner protrusions 24a, which are positioned closer to the rolling elements 13, can be easily fitted to the inner sealing groove 30a, owing to elastic deformation which occurs when the sealing ring 20 is pressed into the opening or deformation due to heat.

Since the depth h2, which is the depth the outer protrusions 24b are inserted into the outer sealing groove 30b, is relatively larger compared to the depth h1, the engagement between the outer protrusions 24b and the outer sealing groove 30b can be maintained, even when the sealing ring 20 has greatly expanded radially outwardly due to thermal expansion, as in the state (expanded state) after the temperature is elevated, shown in FIG. 2 (b). In other words, the engagement between the sealing ring 20 and the inner race 12 can be maintained, and even in this thermally expanded state, it is possible to prevent the generation of a gap through which hazardous foreign substances could enter into the rolling bearing 10.

The depth h2, which is the depth the outer protrusions 24b are inserted into the outer sealing groove 30b, is determined such that no gap is created between the sealing ring 20 and the inner race 12, through which gap hazardous foreign substances could enter, even when the temperature is elevated to the highest temperature expected for the rolling bearing 10, that is, when the amount of thermal expansion of the sealing ring 20 has reached its maximum level (see FIG. 2 (b)).

Therefore, under the temperature conditions expected for the sealing ring 20, the engagement between the outer protrusions 24b with the outer sealing groove 30b is maintained at all times, and it is possible to prevent the generation of a gap between the inner race 12 and the sealing ring 20 through which hazardous foreign substances could enter.

In the present embodiment, the inner protrusions 24a and the outer protrusions 24b are disposed alternately along the circumferential direction, as shown in FIG. 3.

Figure 4:
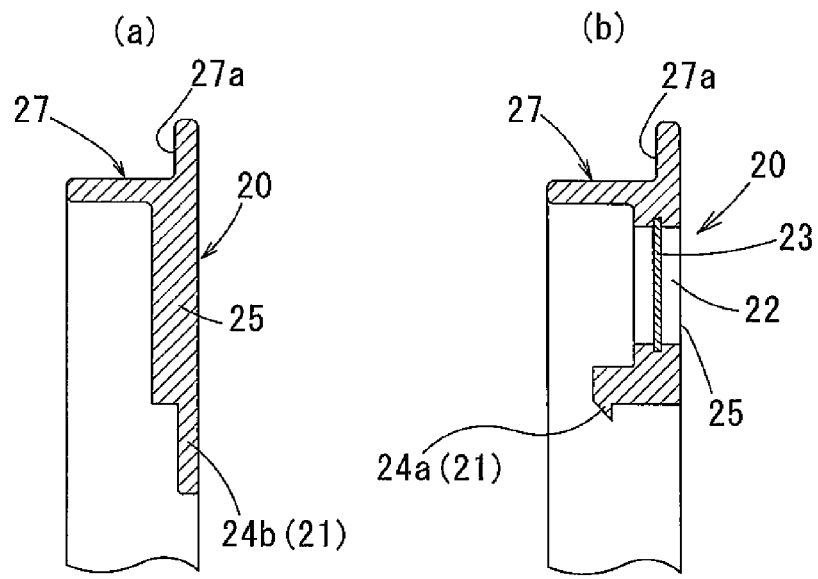
FIG. 4 (*a*) is a sectional view of the sealing member shown in FIG. 3 (*a*) taken along the line A-A.

If the inner protrusions 24a and the outer protrusions 24b are disposed alternately along the circumferential direction, when the sealing ring 20 is pressed into the opening of the bearing space to be fixed thereto, the inner protrusions 24a are less likely to come to the position occupied by the outer protrusions 24b. Therefore, it can be easily visually confirmed that the inner protrusions 24a, which are positioned closer to the rolling elements 13, are fitted into the inner sealing groove 30a. FIG. 4 (a) shows the sectional view of the sealing ring 20 shown in FIG. 3 (a), taken along the line A-A, and FIG. 4 (b) shows the sectional view of the sealing ring 20 shown in FIG. 3 (a), taken along the line B-B. FIG. 1 and FIG. 2 show the sectional views, which correspond to the sectional view of the sealing ring 20 shown in FIG. 3 (b) taken along the line II-II, so that it is possible to compare the relative positions of the inner protrusions 24a and the outer protrusions 24b, and the respective protruding heights thereof extending from the wall portion 25.

Further, in the present embodiment, each outer protrusion 24b is formed such that axial gap w1 is formed within the sealing groove 30b, between a wall which closes the opening of the sealing groove 30b on its axially outer end, and the axially outer surface of the outer protrusion 24b, as shown in FIG. 2 (a). In other words, the axial width of the outer sealing groove 30b is larger than the width of the outer protrusion 24b by the width of the axial gap w1. Therefore, the outer protrusions 24b are capable of moving in the axial direction within the outer sealing groove 30b, by the width of the axial gap w1.

If the outer protrusions 24b are capable of moving in the axial direction within the outer sealing groove 30b, as described above, the outer protrusions 24b are not restricted within the outer sealing groove 30b when the sealing ring 20 is thermally expanded, and therefore, the sealing ring 20 is able to smoothly move in the radial direction as it thermally expands. This allows for preventing the tensile force in the radially outward direction associated with the thermal expansion from being applied to the sealing ring 20, thereby preventing the damage to the filters 23.

As shown in FIG. 2 (a), the outer sealing groove 30b is provided so as to open to the axially outer end surface of the inner race 12. Further, the axially outer end surface of the inner race 12 is configured to come into contact with an axle shoulder (the shoulder portion of an axle) A, which is fitted to the radially inner surface of the inner race 12 to be fixed thereto. Therefore, after each outer protrusions 24b has been fitted into the corresponding outer sealing groove 30b, the opening on the axially outer end side of the outer sealing groove 30b can be closed with the axle shoulder A.

If the outer sealing groove 30b is provided so as to open to the axially outer end surface of the inner race 12, as described above, the sealing ring 20 can be easily fitted into the inner race 12. In addition, since the opening on the axially outer end side of the outer sealing groove 30b can be closed by the axle shoulder A, each of the outer protrusions 24b can be prevented from being removed from the corresponding outer sealing groove 30b.

Further, in the present embodiment, inner protrusions 24a and outer protrusions 24b are formed such that that their positions in the circumferential direction do not coincide. In other words, the radial directions along which both circumferential ends of the corresponding inner protrusions 24a are positioned coincide with the radial directions along which the circumferential ends of the circumferentially adjacent outer protrusions 24b are positioned.

In addition, the oil flow holes 22 and the outer protrusions 24b are disposed such that the radial directions along which the oil flow holes 22 are disposed do not coincide with the radial directions along which the outer protrusions 24b are disposed. This is because, since the portions of the sealing ring 20 in which the oil flow holes 22 are disposed have a small sectional area, if the positions of the oil flow holes 22 circumferentially coincide with the positions of the outer protrusions 24b, which protrude by a relatively large length, forces (such as the tensile force associated with thermal expansion) are more likely to be applied to the portions of the sealing ring 20 having a small sectional area, and to the filters 23 attached thereto. It is also because, since the outer protrusions 24b have a large protruding length and are disposed axially immediately below the portions of the wall portion 25 in which the oil flow holes 22 are disposed, the positions of the outer protrusions 24b are relatively close to the portions having a small sectional area.

The inner protrusions 24a are disposed at the positions radially inward of the positions of the oil flow holes 22, in other words, disposed in the portions of the sealing ring 20 corresponding to the radial directions along which the oil flow holes 22 are disposed. Since the inner protrusions 24a have a protruding length relatively smaller than that of the outer protrusions 24b, and are disposed at positions somewhat offset axially inwardly from the positions axially immediately below the wall portion 25, the positions of the inner protrusions 24a are farther from the portions around the oil flow holes 22, having a small sectional area. Therefore, the inner protrusions 24a are less likely to be affected by the tensile force and the like.

The sealing ring 20 is formed by injection molding. As shown in FIG. 3, weld lines w generated during the injection molding are formed in the portions of the sealing ring 20 corresponding to the radial directions along which the oil flow holes 22 are not disposed. It is advantageous, in terms of strength, to design the sealing ring 20 such that the weld lines w are formed in the portions of the sealing ring 20 other than those in which the oil flow holes 22 are disposed and which have a small sectional area and relatively low strength. In other words, since weld lines w are generated at the portions of the sealing ring 20 having a large sectional area, the reduction in the strength of the sealing ring 20 can be minimized; and at the same time, a favorable effect can be expected such that the fibers are more likely to be intertwined at welded portions at which flows of the resin merge, because the resin is allowed to flow more freely due to the welded portions having a large sectional area.

Figure 6:
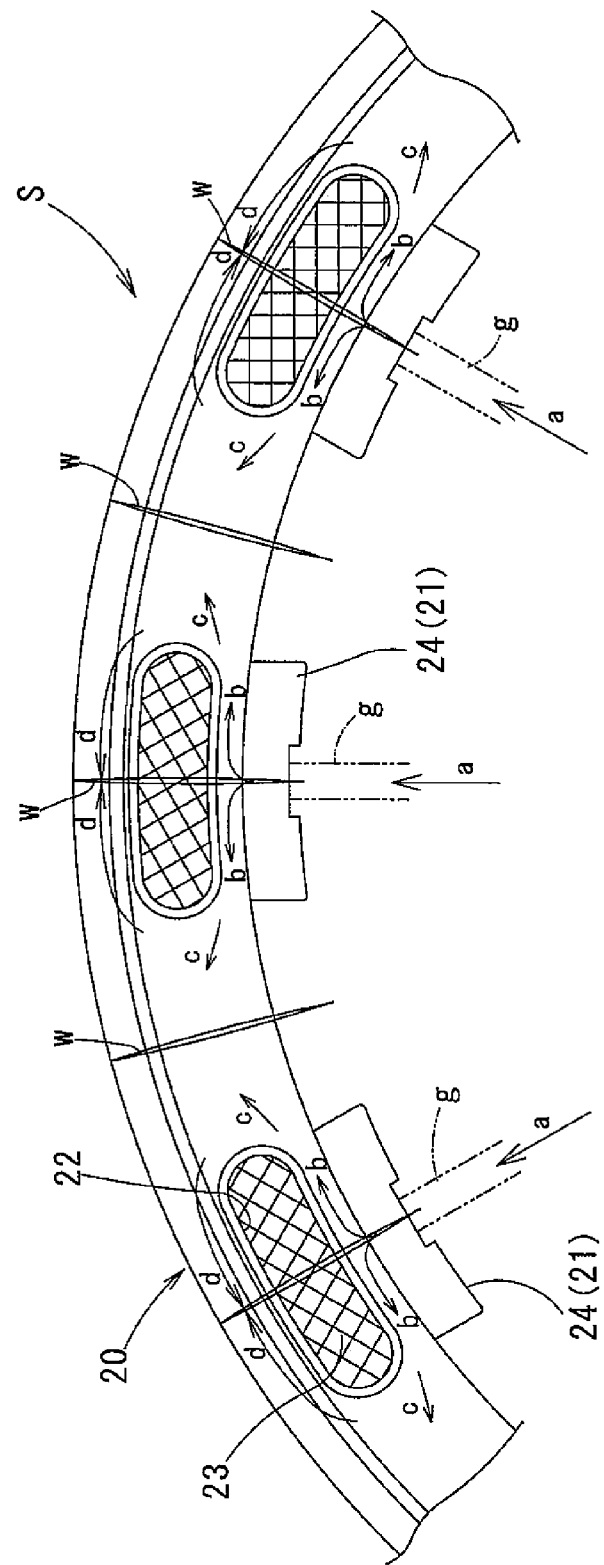
FIG. 6 is a view illustrating the flows of resin and the positions of weld lines in an example of the sealing member in which the arrangement of gates are not preferred.

FIG. 6 shows an unfavorable example in which gates g are disposed in the portions of the sealing ring 20 corresponding to the radial directions along which the oil flow holes 22 are disposed. In FIG. 6, some of the portions constituting the sealing member S are not shown.

In this example, the flows of the resin coming in from the gates g are branched (see arrows a and b in FIG. 6) in order to avoid the members for forming the oil flow holes 22 in the molded article, in the space within a mold, and the branched flows of the resin form the weld lines w (see arrows c in FIG. 6) in the middle of the area between the adjacent oil flow holes 22. At the same time, when the branched resin flows passing around the oil flow holes 22 along their circumferences merge (see arrows d in FIG. 6), the weld lines w are formed likewise. Therefore, as described above, it is preferred that the gates g be disposed in the portions of the sealing ring 20 corresponding to the radial directions along which the oil flow holes 22 are not disposed.

Further, in the embodiment of the present invention, the oil flow holes 22, and the inner protrusions 24a and the outer protrusions 24b of the engaging portions 21 are spaced apart from each other at regular intervals in the circumferential direction of the sealing ring 20, and the respective numbers of oil flow holes 22 and the outer protrusions 24b provided are determined to be the same even number, thereby achieving the preferred arrangement of the weld lines w, as described above.

In other words, if the same even numbers of the oil flow holes 22 and the outer protrusions 24b are formed, respectively, the number of the spaces between the oil flow holes 22 adjoining along the circumferential direction of the sealing ring 20 will also be an even number. Thus, if each of the gates g through which the resin is supplied into the mold during the injection molding is disposed at every other space, of all the even number of spaces between the adjacent oil flow holes 22, the weld lines w can be formed in the spaces therebetween in which the gates g are not disposed.

Further, in the present embodiment, the gates g are disposed at the outer protrusions 24b. The number of the outer protrusions 24b is the same as that of the oil flow holes 22, and each of the outer protrusions 24b is provided at each and every space between the adjacent oil flow holes 22. Each of the gates g is disposed at every other one of the outer protrusions 24b along the circumferential direction of the sealing ring 20.

Therefore, the number of the gates g is half of the number of the oil flow holes 22 (half of the number of the outer protrusions 24b). In addition, the gates g are disposed circumferentially spaced apart from each other at regular intervals.

As shown in FIG. 3, the gates g are disposed in the portions of the sealing ring 20 corresponding to the radial directions along which the outer protrusions 24b are disposed, that is, in the portions of the sealing ring 20 corresponding to the radial directions along which the oil flow holes 22 are not disposed. This prevents the flows of the resin which flow avoiding the oil flow holes 22 and passing around them from merging at portions around the oil flow holes 22, having a small sectional area.

Since the gates g are disposed at the outer protrusions 24b whose protruding length is relatively large, the resin can be smoothly filled into the outer protrusions 24b formed in a protruding manner. However, the gates g are preferably disposed at the portions of the outer protrusions 24b other than those configured to directly engage with one of the recesses 30 provided on the outer peripheral surface of the inner race 12. This is because, since the resin constituting the molded articles is cut and separated at the position of the gates g, there are cases where minute irregularities or small burrs could occur thereat.

In the present embodiment, as shown in FIG. 3 (a), the outer protrusions 24b include convex portions 24c which are provided on the radially inner surface of the sealing ring 20 in a protruding manner, and fitting portions 24d which are provided at the radially inner end of the convex portions 24c in a protruding manner. Each of the fitting portions 24d, which protrude radially inwardly, is configured to engage with one of the recesses 30.

Further, the convex portions 24c are longitudinally shaped along the circumferential direction of the sealing ring 20, and the fitting portions 24d are formed at both longitudinal ends of the respective convex portions 24c. Each of the gates g is formed in the mid portion of the respective convex portions 24c sandwiched between the fitting portions 24d formed at both ends of the respective convex portions 24c. The gates g are preferably provided at the portions of the convex portions 24c other than the fitting portions 24d, each of the fitting portions 24d being configured to engage with one of the recesses 30 formed on the outer peripheral surface of the inner race 12. In other words, gates g are preferably disposed in the portions of the sealing ring 20 corresponding to the radial directions along which the fitting portions 24d are not disposed.

Figure 5:
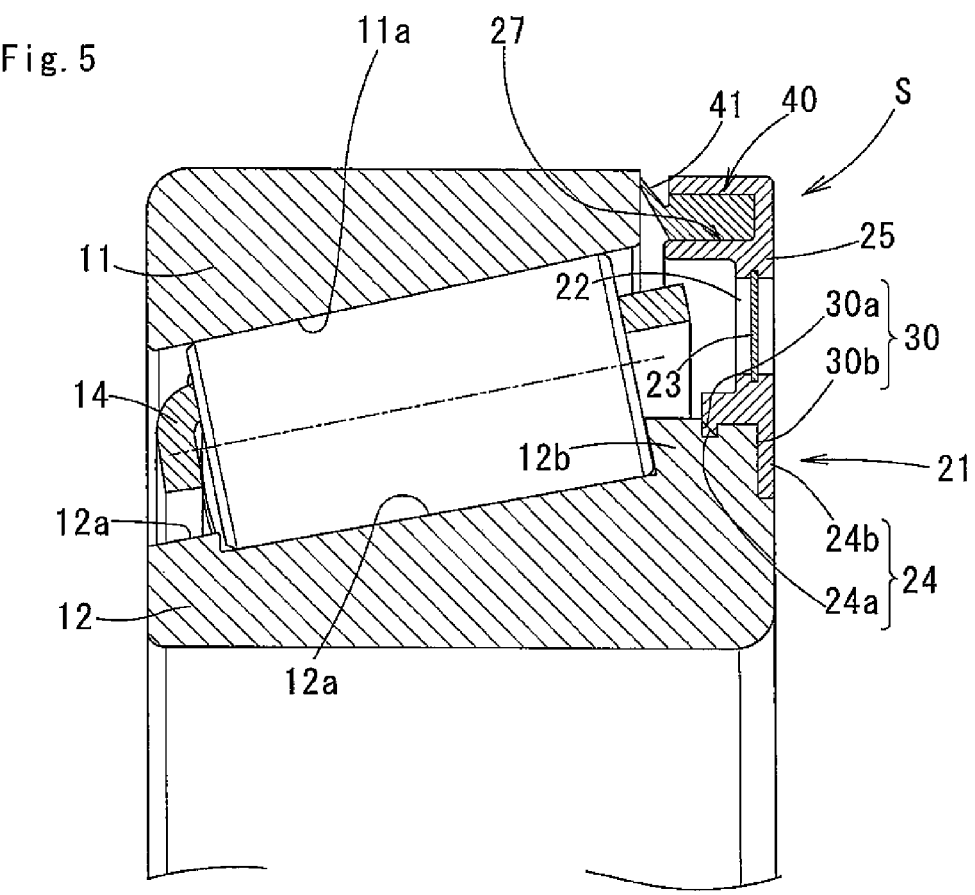
FIG. 5 is a sectional view of a modification of the main section of the rolling bearing shown in FIG. 1.

FIG. 5 shows the modification of the present embodiment. In this modified embodiment, the sectional shape of the lip attaching portion 27 of the sealing ring 20 is formed in the shape of "U".

Since the sectional shape of the lip attaching portion 27 is U-shaped, an effect of protecting the annular member 40 from external forces applied to the sealing ring 20 from radially outward direction can be expected. In addition, because of the U-shaped sectional shape of the lip attaching portion 27, when an adhesive or a filler is used to fix the annular member 40 thereto, an effect of preventing the leaking of the adhesive or the filler can also be expected.

In the present embodiment and the above-mentioned modified embodiment, the protrusions 24 constituting the engaging portions 21 include the inner protrusions 24a disposed at positions closer to the rolling elements 13 and the outer protrusions 24b disposed at positions farther from the rolling elements 13. However, the structure of the engaging portions 21 is not limited thereto. For example, a structure of the engaging portions 21 is also possible in which only the outer protrusions 24b are provided and not the inner protrusions 24a. In other words, a structure can be used in which a plurality of protrusions 24 are provided circumferentially spaced apart from each other at predetermined intervals, but the position at which the protrusions 24 are formed in the inward-outward direction (the axial direction of the bearing) is only one. The sealing grooves 30 are provided in the number and at the positions corresponding to those of the protrusions 24.

At this time, as described in the above embodiment, it is preferred that the same even numbers of the oil flow holes 22 and the protrusions 24 be provided, respectively.

In addition, the oil flow holes 22 and the protrusions 24 are preferably provided circumferentially spaced apart from each other at regular intervals. At the same time, it is preferred that the oil flow holes 22 and the protrusions 24 be disposed such that the radial directions along which the oil flow holes 22 are disposed do not coincide with the radial directions along which the outer protrusions 24b are disposed, and that each of the gates g be disposed at every other one of the protrusions 24 along the circumferential direction. In other words, the number of the gates g through which the resin is supplied during the injection molding is preferably half of the number of the oil flow holes 22.

With this arrangement, the weld lines w which are generated during the injection molding can be formed in the portions of the sealing ring 20 corresponding to the radial directions along which the oil flow holes 22 are not disposed.

Figure 7:
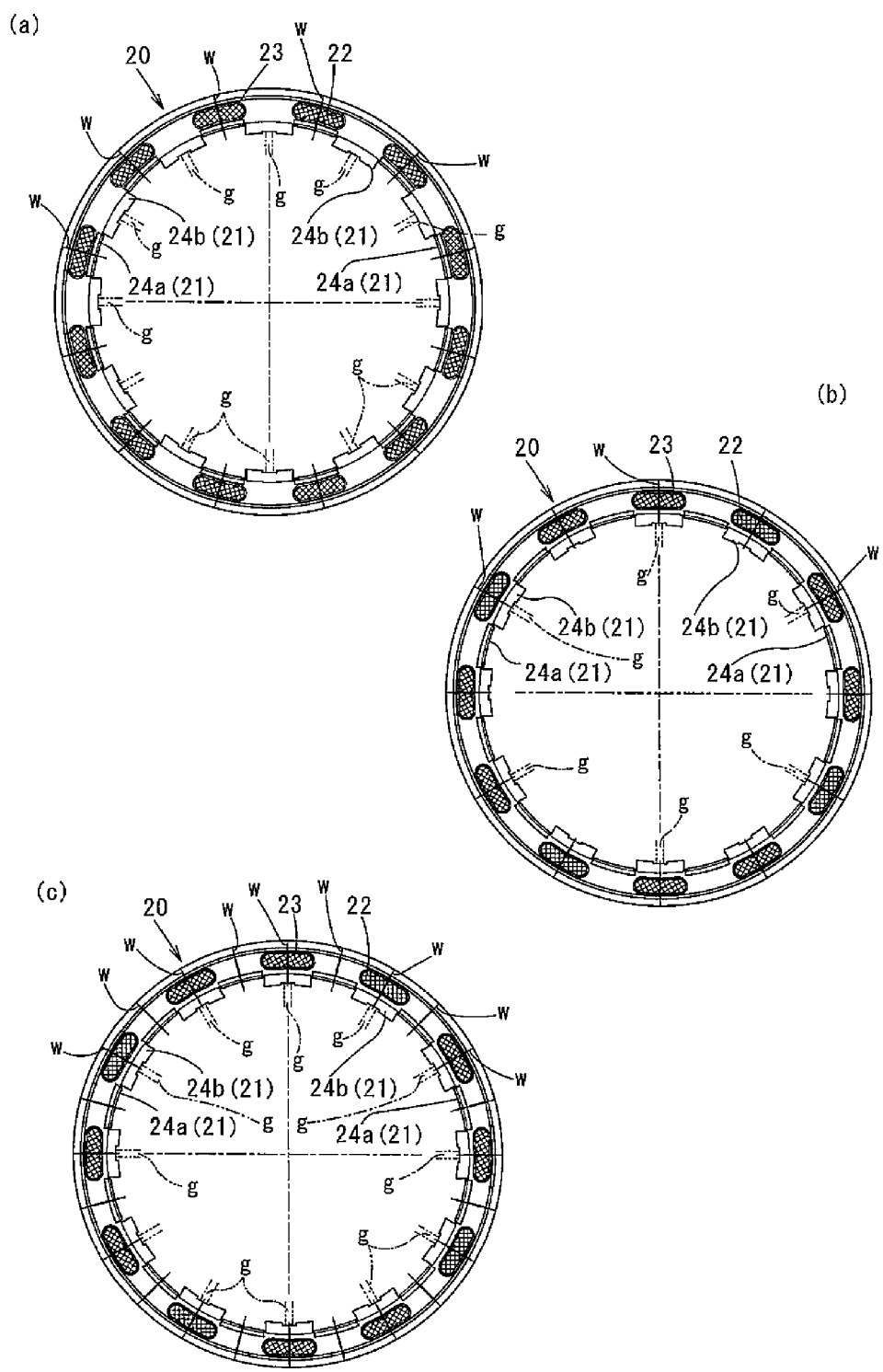
FIGS. 7 (*a*) to 7 (*c*) are side views of the sealing member, each showing an example in which the arrangement of the gates and the weld lines are not preferred.

FIGS. 7 (a) to 7 (c) are side views, each showing an example of the sealing member in which the gates g and the weld lines w are formed at positions in the sealing ring 20 which are not preferred.

In the sealing ring 20 shown in FIG. 7 (a), the same even numbers (12) of the outer protrusions 24b of the engaging portions 21 and the oil flow holes 22 are provided, respectively, and they are formed such that the radial directions along which the outer protrusions 24*b* are disposed do not coincide with the radial directions along which the oil flow holes 22 are disposed. However, since the gates g are provided at all of the outer protrusions 24*b*, the weld lines w are formed in the portions of the sealing ring 20 in which the oil flow holes 22 are disposed and which have a small sectional area.

In the sealing ring 20 shown in FIG. 7 (*b*), the same even numbers (12) of the outer protrusions 24*b* of the engaging portions 21 and the oil flow holes 22 are provided, respectively, as in one shown in FIG. 7 (*a*). However, they are formed such that the radial directions along which the outer protrusions 24*b* are disposed coincide with the radial directions along which the oil flow holes 22 are disposed. Each of the gates g is provided at every other one of the outer protrusions 24*b* along the circumferential direction. In this embodiment, the weld lines w are also formed in the portions of the sealing ring 20 in which the oil flow holes 22 are disposed and which have a small sectional area.

In the sealing ring 20 shown in FIG. 7 (*c*), the same even numbers (12) of the outer protrusions 24*b* of the engaging portions 21 and the oil flow holes 22 are provided, respectively, and they are formed such that the radial directions along which the outer protrusions 24*b* are disposed coincide with the radial directions along which the oil flow holes 22 are disposed. The gates g are provided at all of the outer protrusions 24*b*. In this embodiment, the weld lines w are also formed in the portions of the sealing ring 20 in which the oil flow holes 22 are disposed and which have a small sectional area. In addition, the weld lines w are also formed in the portions of the wall portion 25 between the oil flow holes 22, resulting in an increased number of weld lines compared to the example shown in FIG. 7 (*b*).

Figure 8:
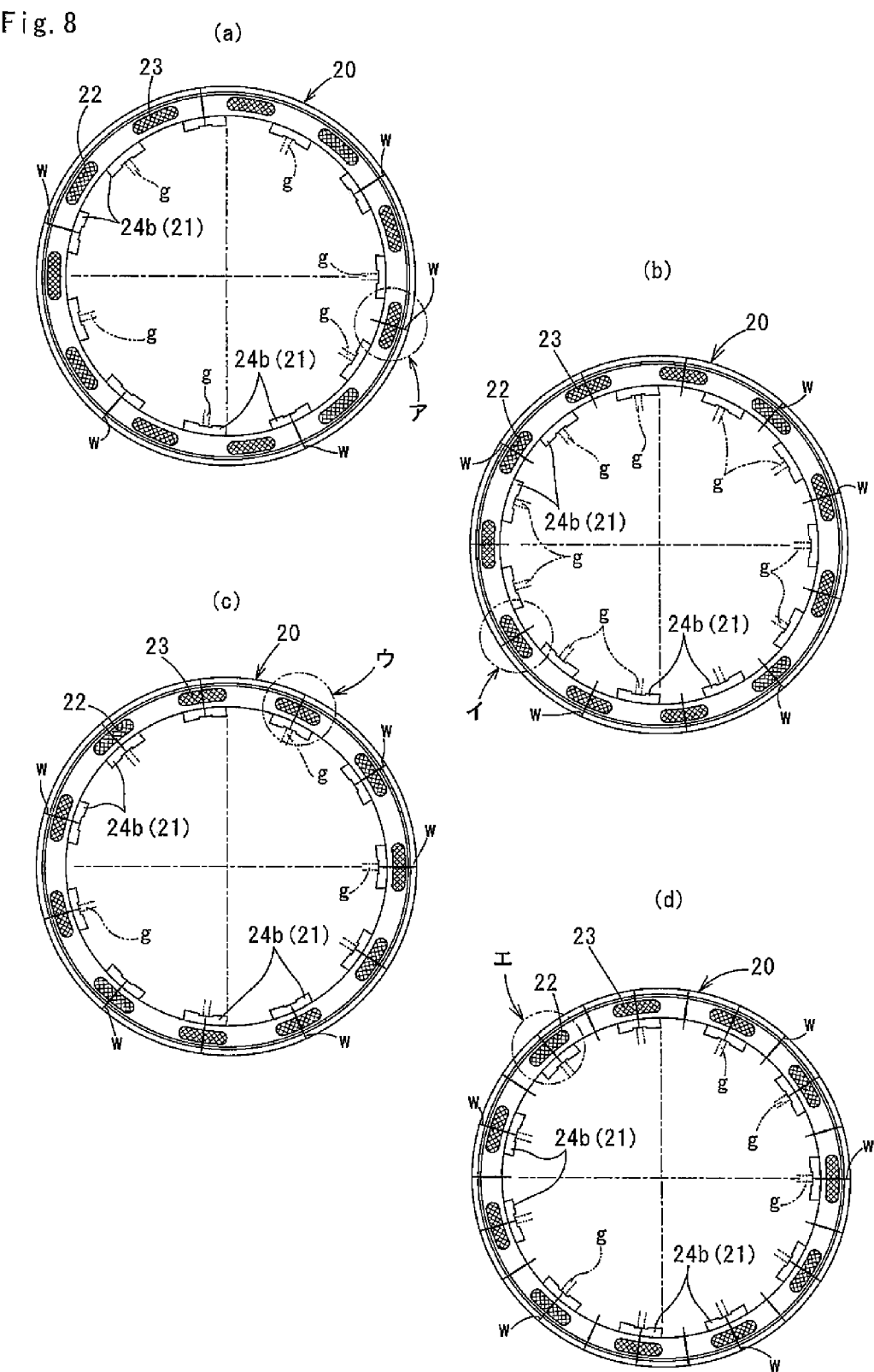
FIGS. 8 (*a*) to 8 (*d*) are side views of the sealing member, each showing an example in which the arrangement of the gates and the weld lines are not preferred.

FIGS. 8 (*a*) to 8 (*d*) are also side views each showing an example of the sealing member in which the gates g and the weld lines w are formed at positions in the sealing ring 20 which are not preferred.

In the sealing ring 20 shown in FIG. 8 (*a*), the same odd numbers (11) of the outer protrusions 24*b* of the engaging portions 21 and the oil flow holes 22 are provided, respectively, and they are formed such that the radial directions along which the outer protrusions 24*b* are disposed do not coincide with the radial directions along which the oil flow holes 22 are disposed. Each of the gates g is provided, in principle, at every other one of the outer protrusions 24*b* along the circumferential direction. However, an exception inevitably occurs where the gates g are disposed at adjacent outer protrusions 24*b*. Therefore, one of the weld lines w is formed in one of the portions of the sealing ring 20 in which the oil flow holes 22 are disposed and which have a small sectional area.

In the sealing ring 20 shown in FIG. 8 (*b*), as in one shown in FIG. 8 (*a*), the same odd numbers (11) of the outer protrusions 24*b* of the engaging portions 21 and the oil flow holes 22 are provided, respectively, and they are formed such that the radial directions along which the outer protrusions 24*b* are disposed do not coincide with the radial directions along which the oil flow holes 22 are disposed. The gates g are formed at all of the outer protrusions 24*b*. Therefore, the weld lines w are formed in the portions of the sealing ring 20 in which the oil flow holes 22 are disposed and which have a small sectional area.

In the sealing ring 20 shown in FIG. 8 (*c*), the same odd numbers (11) of the outer protrusions 24*b* of the engaging portions 21 and the oil flow holes 22 are provided, respectively, and they are formed such that the radial directions along which the outer protrusions 24*b* are disposed coincide with the radial directions along which the oil flow holes 22 are disposed. Each of the gates g is provided, in principle, at every other one of the outer protrusions 24*b* along the circumferential direction. However, an exception inevitably occurs where the gates g are formed at adjacent outer protrusions 24*b*. The weld lines w are formed in the portions of the sealing ring 20 in which the oil flow holes 22 are disposed and which have a small sectional area.

In the sealing ring 20 shown in FIG. 8 (*d*), as in one shown in the FIG. 8 (*c*), the same odd numbers (11) of the outer protrusions 24*b* of the engaging portions 21 and the oil flow holes 22 are provided, respectively, and they are formed such that the radial directions along which the outer protrusions 24*b* are disposed coincide with the radial directions along which the oil flow holes 22 are disposed. The gates g are provided at all of the outer protrusions 24*b*. Therefore, the weld lines w are formed in the portions of the sealing ring 20 in which the oil flow holes 22 are disposed and which have a small sectional area. Therefore, the present embodiment shown in FIG. 3 is more advantageous.

In the sealing ring according the present invention, it is possible to adopt a structure in which the lip portion, which faces the outer race with a gap or comes into contact with the outer race, is formed integrally with the sealing ring, rather than the structure in which a separately formed annular member including the lip portion is fixed to the sealing ring. However, in order to secure the sealing properties, the structure is preferred in which the separately formed annular member is attached to the sealing ring. Further, the type of the rolling bearing 10 to which the sealing ring 20 is attached is not particularly limited. For example, the bearing 10 can be a tapered roller bearing in which tapered rollers are used as the rolling elements 13; a deep groove ball bearing or an angular contact ball bearing in which balls are used as the rolling elements 13; a cylindrical roller bearing including cylindrical rollers; or a self-aligning roller bearing including spherical rollers. In particular, the tapered roller bearing has a structure in which the outer race 11 can be easily separated, and thus, it allows for an easy replacement of the annular member 40.

DESCRIPTION OF SYMBOLS 10 rolling bearing
11 outer race (bearing cup)
11*a* raceway surface
12 inner race (bearing cone)
12*a* raceway surface
12*b* cone back face rib
12*c* cone front face rib
13 tapered roller (rolling element)
14 retainer
20 sealing ring
21 engaging portions
22 oil flow holes
22*a* inner surfaces
23 filters
24 protrusions
24*a* inner protrusions
24*b* outer protrusions
25 wall portion
27 lip attaching portion
27*a* inner end surface
30 sealing grooves
30*a* inner sealing groove
30*b* outer sealing groove
40 annular member 40a outer end surface
41 lip portion
g gates
w weld lines
S sealing member

The invention claimed is:

1. A rolling bearing comprising: an outer race; an inner race; and rolling elements received between the outer race and the inner race;
   wherein at least one end of an opening of a bearing space formed between the outer race and the inner race is covered with a sealing ring made of a resin;
   wherein the sealing ring is provided with oil flow holes, and the respective oil flow holes are provided with filters configured to capture foreign substances contained in a lubricating oil; and
   wherein the sealing ring is formed by injection molding, and weld lines generated during the injection molding are formed in portions of the sealing ring corresponding to radial directions along which the oil flow holes are not disposed.

2. The rolling bearing according to claim 1, wherein gates through which the resin is supplied during the injection molding are disposed in the portions of the sealing ring corresponding to the radial directions along which the oil flow holes are not disposed.

3. The rolling bearing according to claim 1, wherein the sealing ring comprises a plurality of engaging portions provided on a radially inner surface of the sealing ring in a protruding manner along a circumferential direction thereof; wherein the inner race comprises recesses provided on an outer peripheral surface thereof and engaging with the engaging portions; wherein an annular member made of a material softer than that of the sealing ring is fixed to the sealing ring; and wherein the annular member includes a lip portion which faces the outer race with a gap or comes into contact with the outer race.

4. The rolling bearing according to claim 3, wherein the sealing ring is made of a glass fiber reinforced resin, and wherein the annular member is made of a rubber.

5. The rolling bearing according to claim 3, wherein an even number of the oil flow holes and an even number of the engaging portions are formed, respectively.

6. The rolling bearing according to claim 5, wherein the engaging portions comprise inner protrusions disposed on an axially inward side thereof and protruding radially inwardly at a relatively low height, and outer protrusions disposed on an axially outward side thereof and protruding radially inwardly at a relatively high height; and wherein the oil flow holes and the outer protrusions are disposed such that radial directions along which the oil flow holes are disposed do not coincide with radial directions along which the outer protrusions are disposed.

7. The rolling bearing according to claim 6, wherein the outer protrusions comprise convex portions provided on the radially inner surface of the sealing ring in a protruding manner, and fitting portions included in the convex portions; wherein the fitting portions are configured to engage with one of the recesses, and wherein the gates through which the resin is supplied during the injection molding are disposed in portions of the sealing ring corresponding to radial directions along which the fitting portions of the convex portions are not disposed.

8. A method for producing the rolling bearing according to claim 3,
   wherein gates through which the resin is supplied during the injection molding are disposed in the portions of the sealing ring corresponding to the radial directions along which the oil flow holes are not disposed, so that the weld lines generated during the injection molding are formed in the portions of the sealing ring corresponding to the radial directions along which the oil flow holes are not disposed.

* * * * *